(12) United States Patent
Park et al.

(10) Patent No.: US 7,752,568 B2
(45) Date of Patent: Jul. 6, 2010

(54) CONTROL METHOD FOR DIGITAL IMAGE PROCESSING APPARATUS FOR CONVENIENT MOVEMENT MODE AND DIGITAL IMAGE PROCESSING APPARATUS USING THE METHOD

(75) Inventors: Se-hyun Park, Goyang-si (KR); Chang-beom Shin, Seoul (KR); Eun-kyung Lee, Seoul (KR); Na-ri Choi, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 269 days.

(21) Appl. No.: 11/432,817

(22) Filed: May 11, 2006

(65) Prior Publication Data

US 2007/0174780 A1    Jul. 26, 2007

(30) Foreign Application Priority Data

Jan. 26, 2006   (KR)  .................. 10-2006-0008245

(51) Int. Cl.
*G06F 3/048* (2006.01)
(52) U.S. Cl. .................................... 715/772
(58) Field of Classification Search .............. 715/772
See application file for complete search history.

(56) References Cited

U.S. PATENT DOCUMENTS 3,916,099 A * 10/1975 Hlady ................... 178/18.04

2004/0257459 A1   12/2004   Shim

FOREIGN PATENT DOCUMENTS

JP      2003-219325 A       7/2003

OTHER PUBLICATIONS

Paul McFedries, "Complete Idiot's Guide to Windows XP," Oct. 3, 2001 Alpha Books.*
Microsoft Press, "Microsoft Windows User Experience," 1999.*
Bricklin, "Tablet PC: First Impressions," Nov. 2002.*
www.jordan.pausd.org/laptop/trackpad.html, "Trackpad Controls," Feb. 2005.*
Videobotics, "Videobotics WebCam and CamMotion FAQ," Dec. 2001.*

* cited by examiner

*Primary Examiner*—William L Bashore
*Assistant Examiner*—Daniel Um
(74) *Attorney, Agent, or Firm*—Drinker Biddle & Reath LLP (57) ABSTRACT

Provided is a control method for a digital image processing apparatus having a movement mode in which a user moves a target object to a target position, the method including: displaying icons including an image icon of a target object and an icon indicating a target position; displaying an icon indicating a new target position in response to the detection of a target position change signal; displaying an image icon of a new target object in response to the detection of a target object change signal; and moving the target object of the image icon currently displayed to the target position indicated by the icon currently displayed in response to the detection of a movement signal.

21 Claims, 10 Drawing Sheets

CONTROL METHOD FOR DIGITAL IMAGE PROCESSING APPARATUS FOR CONVENIENT MOVEMENT MODE AND DIGITAL IMAGE PROCESSING APPARATUS USING THE METHOD

This application claims the priority of Korean Patent Application No. 10-2006-0008245, filed on Jan. 26, 2006, in the Korean Intellectual Property Office, the disclosure of which is incorporated herein in its entirety by reference.

BACKGROUND OF THE INVENTION

1. Field of the Invention

The present invention relates to a method of controlling a digital image processing apparatus and a digital image processing apparatus using the method. More particularly, it relates to a control method for a digital image processing apparatus having a movement mode in which a user moves at least one target object, for example, a file, to a desired target position, for example, a folder, and a digital image processing apparatus using the method.

2. Description of the Related Art

A conventional digital image processing apparatus is disclosed in U.S. Patent Publication No. 257,459 entitled "Method of Controlling Portable Digital Apparatus where Folder Icons Move", which was filed in 2004. The disclosed conventional digital image processing apparatus includes a user input unit, a display panel, a controller, and at least one recording medium. A plurality of files and a plurality of folders are created in the at least one recording medium.

When such a conventional digital image processing apparatus is used, many manipulations are required to move an object, for example, a file created in a recording medium, to a desired target position, for example, a folder. In other words, a user cannot easily sort and manage files.

SUMMARY OF THE INVENTION

Various embodiments of the present invention provide a digital image processing apparatus and a method of controlling a digital image processing apparatus. In embodiments of the method and apparatus, a user may easily sort and manage files by moving a target object created in a recording medium to a desired folder.

In an embodiment, a method for controlling a digital image processing apparatus is provided. In an embodiment, the method includes: displaying icons comprising a target object image icon and a target position icon, wherein the target object image icon represents a target object and the target position icon represents a target position; detecting a target position change signal and, in response thereto, displaying a new target image icon; detecting a target object change signal and, in response thereto, displaying a new target object image icon; and detecting a movement signal, and in response thereto, moving the target object represented by the target object image icon that is currently displayed to the target position represented by the target position icon that is currently displayed.

In an embodiment, there is provided a control method for a digital image processing apparatus having a movement mode for moving a target object to a target position. In an embodiment, the method includes: displaying an image icon of a target object and an icon indication a target position; activating the icon indicating the target position; detecting a target position change signal and, in response thereto, displaying and activating an icon indicating a new target position; detecting a target object change signal and, in response thereto, displaying an image icon of a new target object; detecting a cancel/select signal, and in response thereto, selecting the target object for the image icon currently displayed if it is not already selected, and canceling the selected target object for the image icon currently displayed if it is already selected; and detecting a movement signal, and in response thereto, moving the selected target object to the target position indicated by the activated icon.

In another embodiment, there is provided a digital image processing apparatus. In an embodiment, the digital image processing apparatus comprises: a display panel for displaying digital images comprising icons including a target object image icon corresponding to a target object and a target position icon corresponding to a target position; a user input unit for generating control signals, and a controller that detects the control signals and, in response thereto, controls the apparatus. In an embodiment, the control signals comprise a target position change signal for changing the target position of the target object, a target object change signal for changing the target object to be moved, and a movement signal for directing the target object to move to the target position. In an embodiment, the controller controls the apparatus to display a new target position icon indicating a new target position if the target position change signal is detected; display a new target object image icon if the target object change signal is detected; and move the target object corresponding to the target object image icon currently displayed to the target position corresponding to the target position icon currently displayed if the movement signal is detected.

In various embodiments of the method and the digital image processing apparatus, an image icon of a target object and an icon indicating a target position are displayed, and a new target object and an icon indicating a new target position are displayed in response to change signals generated by a user. In addition, a target object of an image icon currently displayed is moved to a target position of an icon currently displayed in response to a movement signal generated by the user. Since the user can easily move a target object to a desired target position in a movement mode, the user can easily sort files.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

The present invention will now be described more fully with reference to the accompanying drawings, in which various embodiments of the invention are shown. The invention may, however, be embodied in many different forms and should not be construed as being limited to the embodiments set forth therein; rather, these embodiments are provided so that this disclosure will be thorough and complete and will fully convey the concept of the invention to those skilled in the art.

Figure 1:
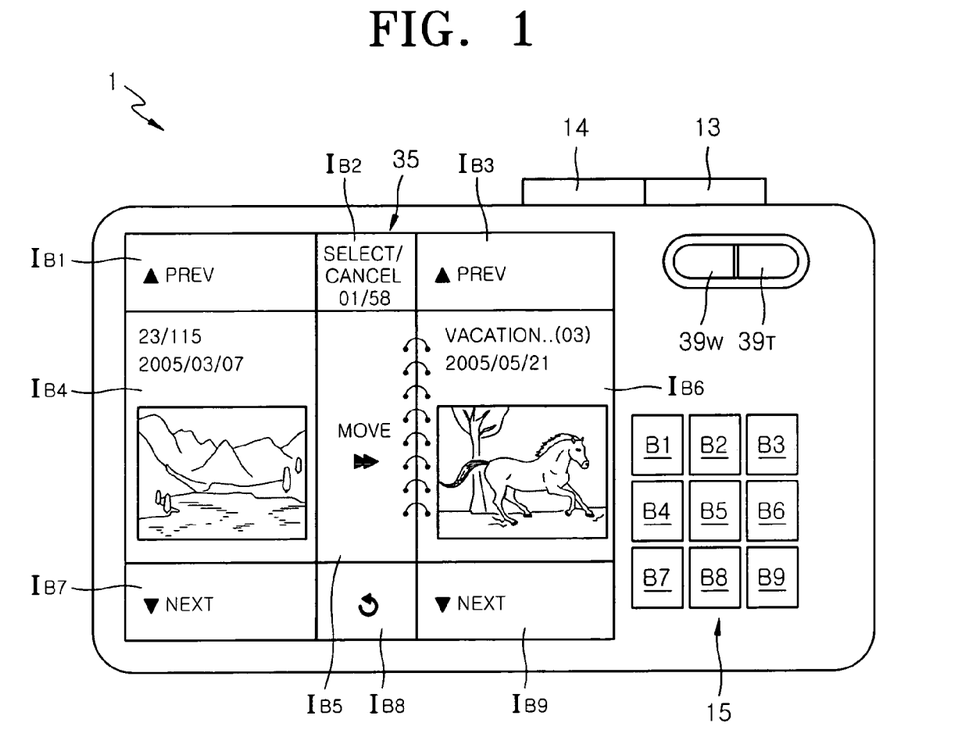
FIG. 1 illustrates the back of a digital camera, which is an embodiment of a digital image processing apparatus, on which nine icons including an image icon of a file and an icon that indicates a folder are displayed according to an embodiment of the present invention.

An embodiment of a digital image processing apparatus according to an embodiment of the present invention will now be discussed with reference to FIG. 1. In an embodiment, the digital image processing apparatus is a digital camera. As shown in FIG. 1, the back of a digital camera 1 according to the present invention displays nine icons $I_{B1}$ through $I_{B9}$ including an image icon $I_{B4}$ of a file and an icon $I_{B6}$, which indicates a folder. The digital camera 1 includes a color LCD panel 35, nine input buttons (B1, B2, B3, B4, B5, B6, B7, B8 and B9) 15, a shutter release button 13, mode buttons 14 for setting operating modes of the digital camera 1, a wide-angle zoom button $39_W$, and a telephoto-zoom button $39_T$.

In a movement mode of the digital camera 1 in which a user moves at least one file to a desired folder, the nine icons $I_{B1}$ through $I_{B9}$ are displayed at positions corresponding to the positions of the nine input buttons 15, as shown in FIG. 1. More specifically, the previous file icon $I_{B1}$ is displayed at a position corresponding to the position of the previous file button B1. The select/cancel icon $I_{B2}$ is displayed at a position corresponding to the position of the select/cancel button B2. The previous folder icon $I_{B3}$ is displayed at a position corresponding to the position of the previous folder button B3. The movement icon $I_{B5}$ is displayed at a position corresponding to the position of the movement button B5. The next file icon $I_{B7}$ is displayed at a position corresponding to the position of the next file button B7. The return icon $I_{B8}$ is displayed at a position corresponding to the position of the return button B8. The next folder icon $I_{B9}$ is displayed at a position corresponding to the position of the next folder button B9.

As shown in FIG. 1, the nine icons $I_{B1}$ through $I_{B9}$ include the image icon $I_{B4}$ of a file and the icon $I_{B6}$ indicating a folder. When the previous folder button B3 or the next folder button B9 included in a first input unit that generates a target position change signal is pressed, an icon indicating a new folder is displayed. When the previous file button B1 or the next file button B7 included in a second input unit that generates a target object change signal is pressed, an icon indicating a new file is displayed. When the movement button B5 as a third input unit that generates a movement signal is pressed, a file for the image icon $I_{B4}$ currently displayed is moved to a file for the icon $I_{B6}$ currently displayed. Therefore, as will be described in more detail later with reference to FIGS. 2 through 7, in the movement mode of the digital camera 1, a user can easily move a file as a target object to a desired folder as a target position.

Figure 2:
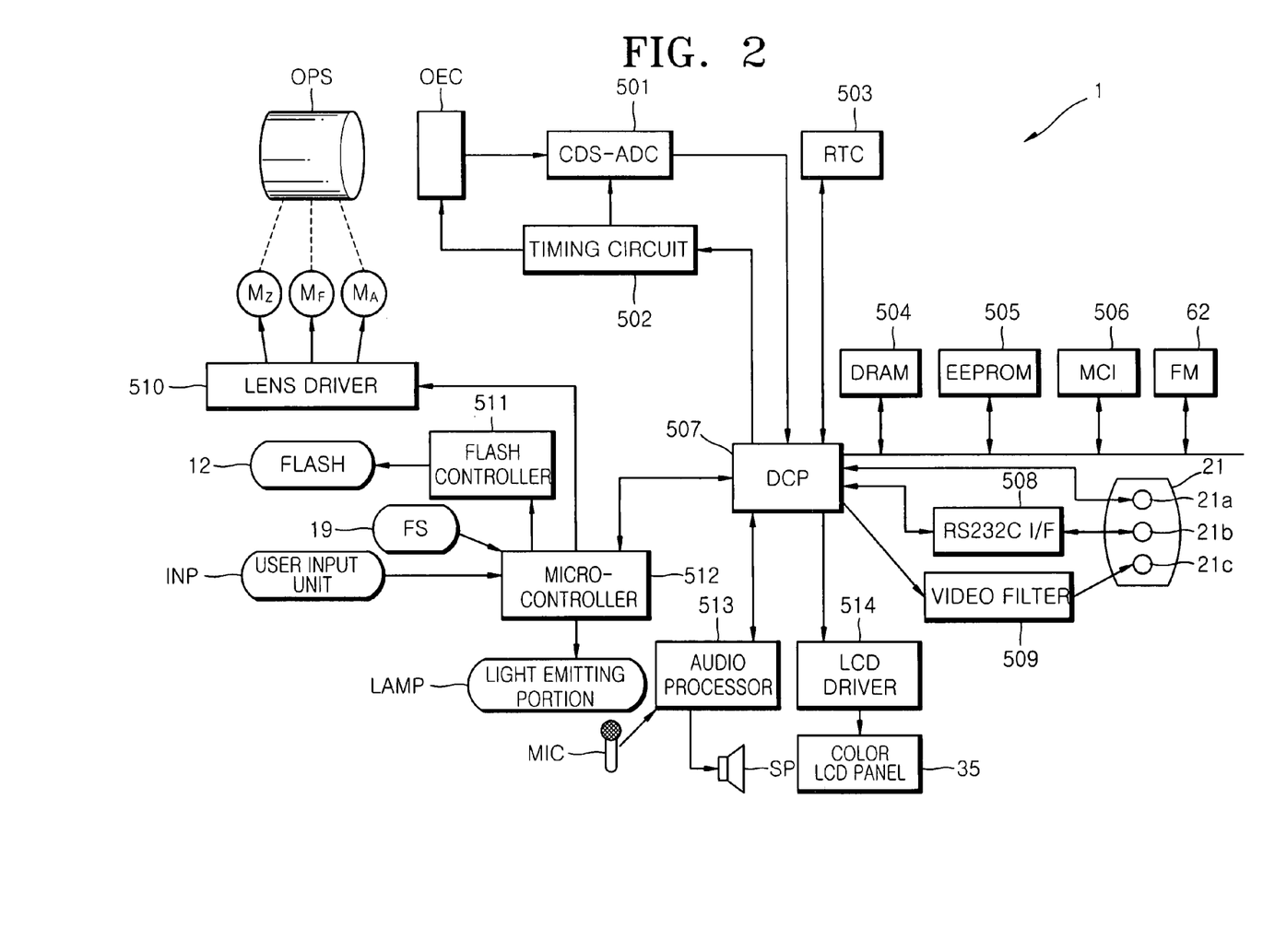
FIG. 2 is a schematic diagram of an embodiment of the configuration of the digital camera of FIG. 1.

FIG. 2 is a schematic diagram of an embodiment of the configuration of the digital camera 1 of FIG. 1. The configuration and operation of the digital camera 1 of FIG. 1 will now be described with reference to FIGS. 1 and 2.

An optical system (OPS) including a lens unit and a filter unit optically processes light. The lens unit of the OPS includes a zoom lens, a focus lens, and a compensation lens.

When a user presses the wide-angle zoom button $39_W$ or the telephoto-zoom button $39_T$ included in the user input unit (INP), a signal corresponding to the wide-angle zoom button $39_W$ or the telephoto-zoom button $39_T$ is relayed to the micro-controller 512. The micro-controller 512 controls a lens driver 510, thereby running a zoom motor $M_Z$, which in turn, moves the zoom lens.

In an automatic focusing mode, a main controller built into a digital camera processor (DCP) 507 controls the lens driver 510 through the micro-controller 512, thereby driving a focus motor $M_F$. Accordingly, when the focus lens is moved, the position of the focus lens, for example, a number of driving steps of the focus motor $M_F$, having a largest high frequency component of an image signal is set. Reference numeral $M_A$ indicates a motor for driving an aperture (not shown).

A photoelectric conversion unit (OEC) of a charge coupled device or a complementary metal oxide (CMOS) semiconductor converts light from the OPS into an analog electrical signal. Here, the DCP 507 controls a timing circuit 502 to control the operations of the OEC and a correlation-double-sampler-and-analog-to-digital converter (CDS-ADC) 501. The CDS-ADC 501 processes an analog signal from the OEC, eliminates high frequency noise, adjusts amplitude, and then converts the analog signal into a digital signal.

A real time clock (RTC) 503 provides time information to the DCP 507. The DCP 507 processes the digital signal from the CDS-ADC 501 and generates a digital image composed of luminance and chromaticity values.

A light-emitting portion (LAMP) is operated by the micro-controller 512 in response to a control signal generated by the DCP 507 including the main controller. The light source (LAMP) includes indicating lamps.

The INP includes the shutter release button 13, the mode buttons 14, the wide angle-zoom button $39_W$, the telephoto-zoom button $39_T$, and the nine input buttons 15.

A dynamic random-access memory (DRAM) 504 temporarily stores a digital image signal from the DCP 507. An electrically erasable and programmable read-only memory (EEPROM) 505 stores program and setting data. A recording medium in the form of a user's memory card, such as a secure digital (SD) card, may be inserted into or removed from a memory card interface 506.

The digital image signal from the DCP 507 is input to an LCD driver 514, thereby displaying an image on the color LCD panel 35.

In an interface unit 21, the digital image signal from the DCP 507 can be transmitted via a universal serial bus (USB) connector 21a or as serial communications via an RS232C interface 508 and an RS232C connector 21b. The digital image signal from the DCP 507 can also be transmitted as a video signal via a video filter 509 and a video output unit 21c.

An audio processor 513 can relay sound from a microphone MIC to the DCP 507 or to a speaker SP. In addition, the audio processor 513 can output an audio signal from the DCP 507 to the speaker SP.

The micro-controller 512 controls the operation of a flash controller 511 in response to a signal from a flash light intensity sensor (not shown), thereby driving a flash 12.

Figure 3:
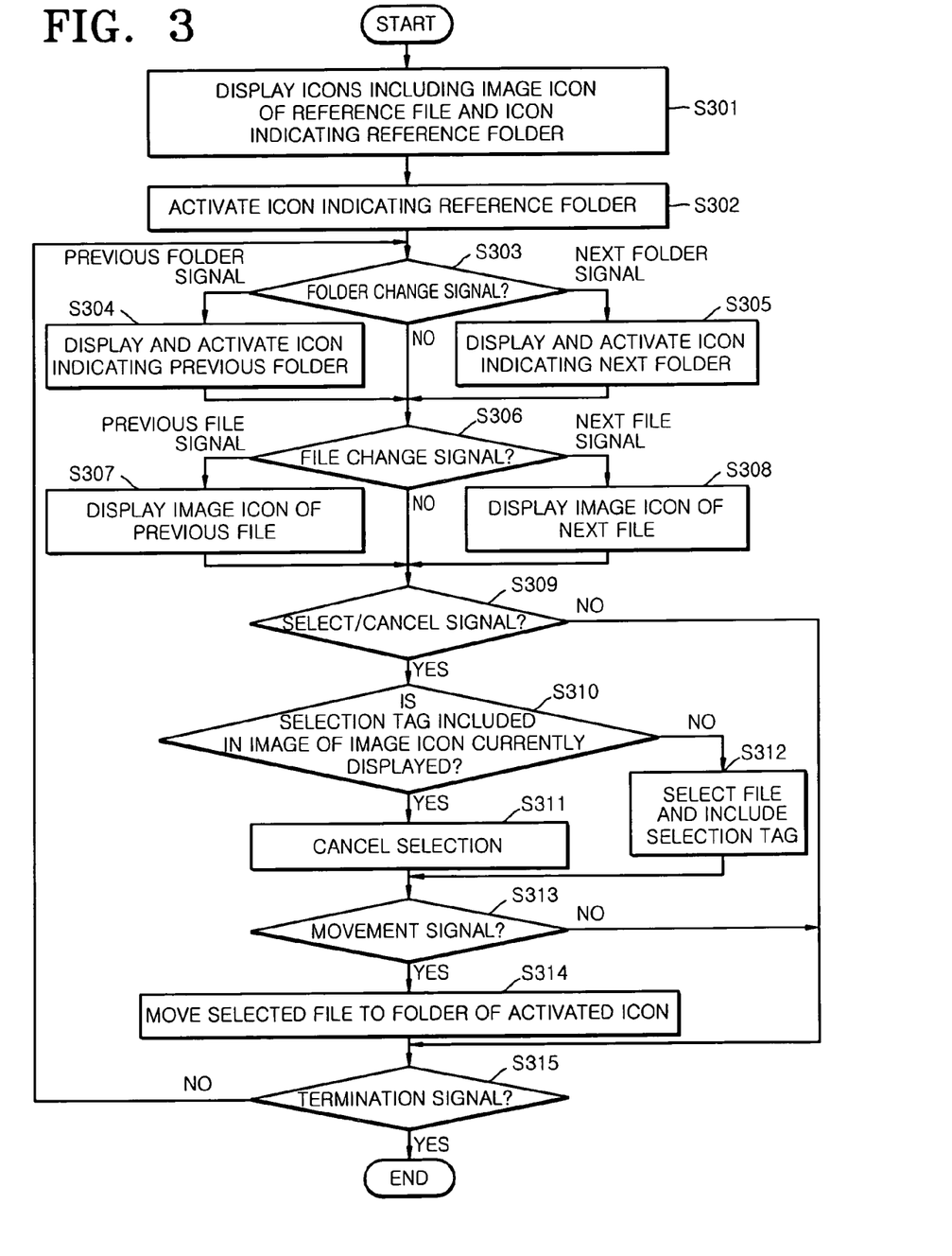
FIG. 3 is a flowchart illustrating an embodiment of a control program of the digital camera processor (DCP) illustrated in FIG. 2, wherein the digital camera of FIG. 1 is in a movement mode.
Figure 4:
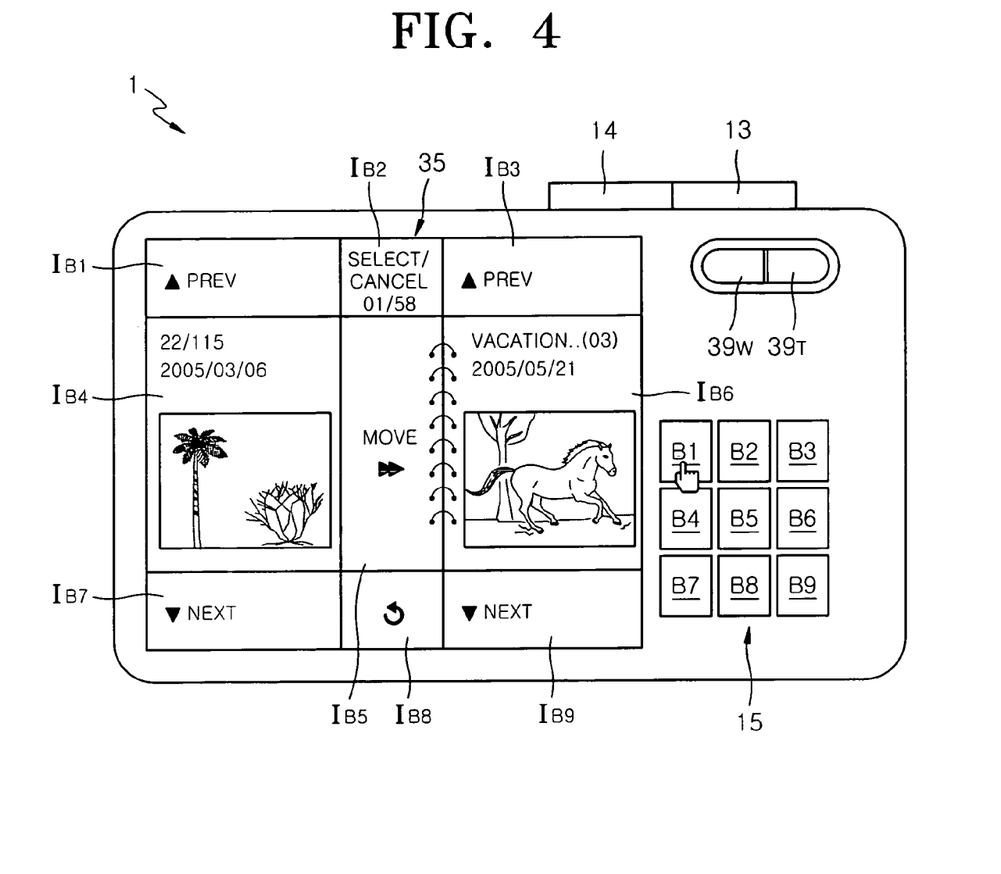
FIG. 4 illustrates a case where operation S307 of FIG. 3 is performed when the digital camera is in a state illustrated in FIG. 1.
Figure 5:
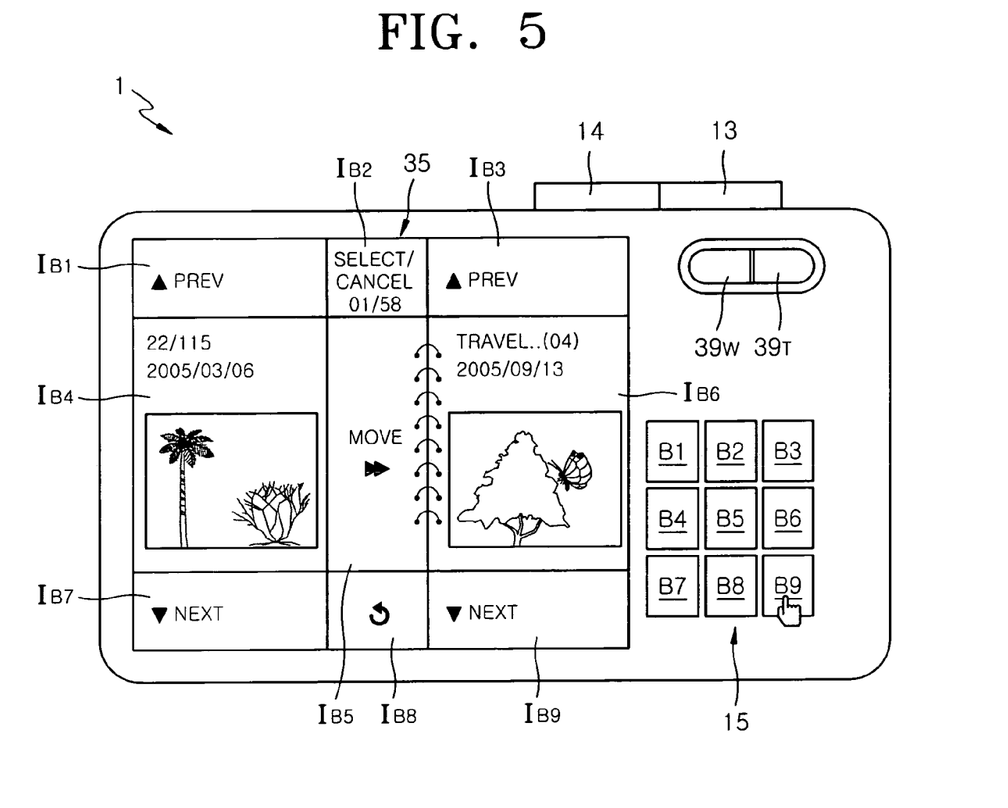
FIG. 5 illustrates a case where operation S305 of FIG. 3 is performed when the digital camera is in a state illustrated in FIG. 4.
Figure 6:
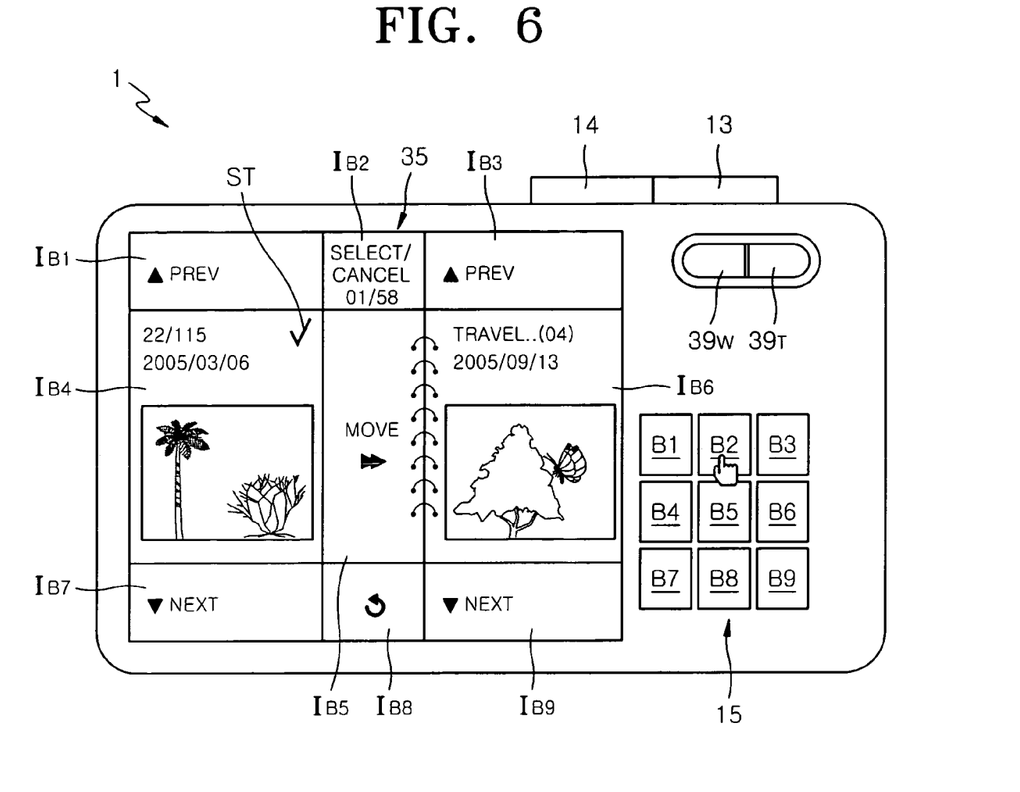
FIG. 6 illustrates a case where operation S312 of FIG. 3 is performed when the digital camera is in a state illustrated in FIG. 5.
Figure 7:
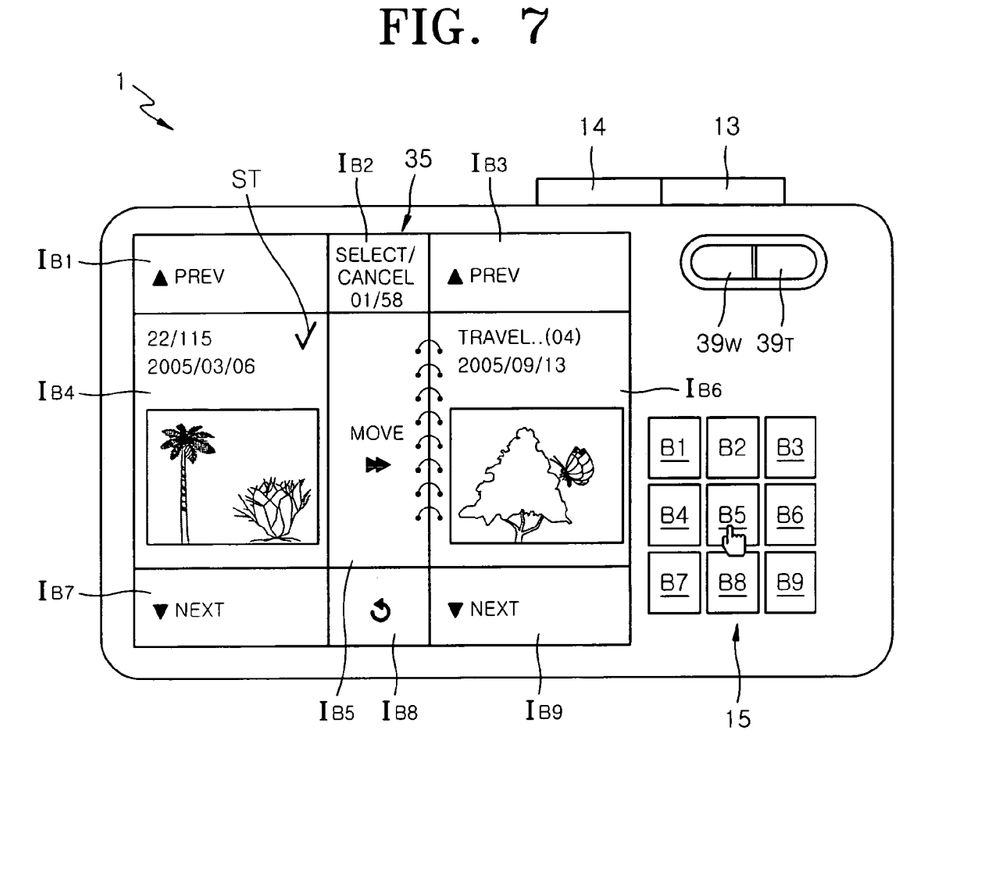
FIG. 7 illustrates a case where operation S313 of FIG. 3 is performed when the digital camera is in a state illustrated in FIG. 6.

FIG. 3 is a flowchart illustrating an embodiment of a control program of the DCP 507 illustrated in FIG. 2 when the digital camera 1 of FIG. 1 is in the movement mode. FIG. 4 illustrates a case where operation S307 of FIG. 3 is performed when the digital camera 1 is in the state illustrated in FIG. 1. FIG. 5 illustrates a case where operation S305 of FIG. 3 is performed when the digital camera 1 is in the state illustrated in FIG. 4. FIG. 6 illustrates a case where operation S312 of FIG. 3 is performed when the digital camera 1 is in the state illustrated in FIG. 5. FIG. 7 illustrates a case where operation S313 of FIG. 3 is performed when the digital camera 1 is in the state illustrated in FIG. 6.

In various embodiments of the present invention, in the movement mode of a digital image processing apparatus, a target object is a file and a target position is a folder. The target object, however, is not limited to a file and the target position is not limited to a folder. For example, the target object may be file information and the target position may be an album. In this case, an album stores file information for sorting image files obtained after a photographing operation.

In an embodiment, a target object may be moved to a target position between a built-in recording medium, for example, a flash memory 62, and an insertable recording medium such as a SD card in the memory card interface 506. In another embodiment, for wireless interactive communications or well-known interactive universal serial bus-on the go (USB-OTG) communications, a target object can be moved from a built-in recording medium or an insertable recording medium on a first apparatus to a target position on a recording medium of a second apparatus, which may be referred to as a target apparatus, for communication.

An embodiment of the present invention will now be described with reference to FIGS. 1 through 7, with particular focus on FIG. 3, which illustrates an embodiment of a program for controlling the DCP 507 while a digital camera 1 is in a movement mode.

The DCP 507 displays the nine icons $I_{B1}$ through $I_{B9}$ including the image icon $I_{B4}$ (see FIG. 1) of a reference file as a target reference object and the icon $I_{B6}$ (see FIG. 1) indicating a reference folder as a target reference position (operation S301). In this case, a file recently created is set as a reference file, and a folder recently created is set as a reference folder. Next, the DCP 507 activates the icon $I_{B6}$, which indicates the reference folder (operation S302).

A user may generate a folder change signal by pressing the previous folder button B3 or the next folder button B9. When a folder change signal is detected by the DCP 507, the DCP determines whether it is a previous folder signal or a next folder signal (operation S303). When a user presses the previous folder button B3, thereby generating a previous folder signal (operation S303), the DCP 507 displays and activates an icon indicating a previous folder of the reference folder indicated by the currently activated icon $I_{B6}$ (operation S304). When the user presses the next folder button B9, thereby generating a next folder signal (operation S303), the DCP 507 displays and activates an icon indicating a next folder of the reference folder indicated by the currently activated icon $I_{B6}$ (operation S305, see FIG. 5).

A user may generate a file change signal by pressing the previous file button B1 or the next file button B7. When a file change signal is detected by the DCP 507, the DCP determines whether it is a previous file signal or a next file signal (operation S306). When the user presses the previous file button B1, thereby generating a previous file signal (operation S306), the DCP 507 displays an image icon of a previous file of the reference file indicated by the currently displayed icon $I_{B4}$ (operation S307, see FIG. 4). When the user presses the next file button B7, thereby generating a next file signal (operation S306), the DCP 507 displays an image icon of a next file of the reference file indicated by the currently displayed icon $I_{B4}$ (operation S308).

When the user presses the select/cancel button B2, thereby generating a select/cancel signal (operation S309), the DCP 507 determines whether a selection tag ST is included in an image of the currently displayed icon $I_{B4}$ (operation S310).

When the selection tag ST is included in the image of the currently displayed icon $I_{B4}$, the DCP 507 removes the selection tag ST from the image of the currently displayed icon $I_{B4}$ and cancels the selection of the reference file indicated by the currently displayed icon $I_{B4}$ (operation S311).

When the selection tag ST is not included in the image of the currently displayed icon $I_{B4}$, the DCP 507 includes the selection tag ST in the image of the currently displayed icon $I_{B4}$ and selects the reference file indicated by the currently displayed icon $I_{B4}$ (operation S312, see FIG. 6).

When the user presses the movement button B5, thereby generating a movement signal (operation S313), the DCP 507 moves the selected file to the folder indicated by the currently activated icon $I_{B6}$ (operation S314, see FIG. 7).

Operations S303 through S314 are repeated until an external termination signal is generated (operation S315).

Although placement of a reference file into a selected folder is discussed above with reference to movement of the file into the folder, in other embodiments of a movement mode, a file may also be moved through copying.

Figure 8:
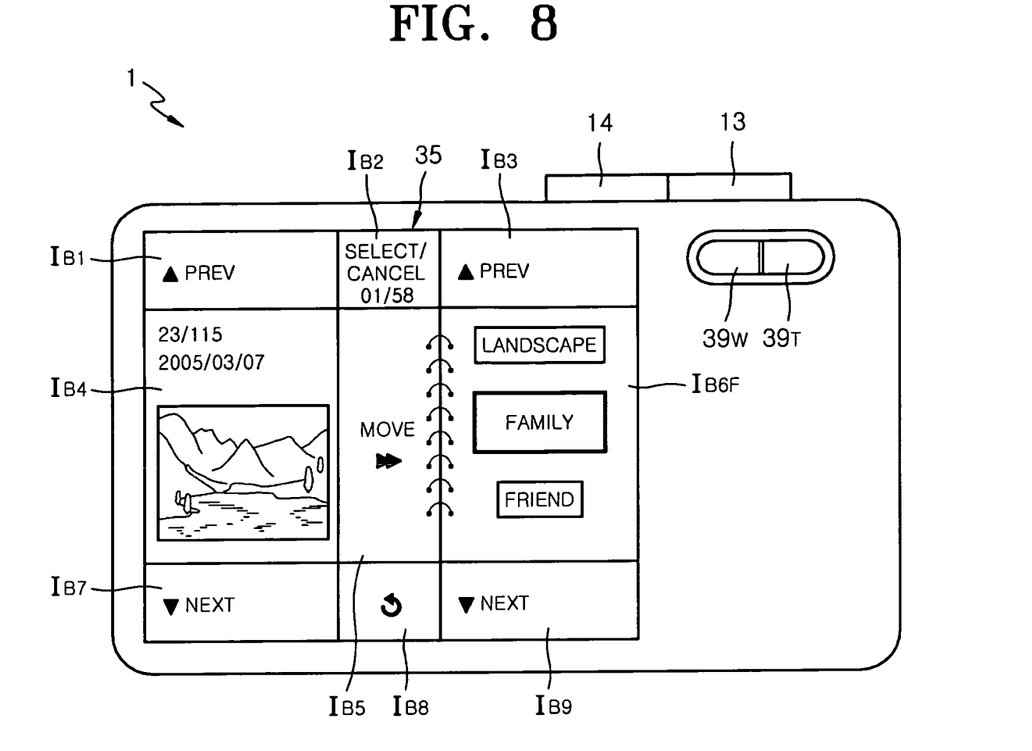
FIG. 8 illustrates the back of a digital camera on which names of a plurality of folders in a plurality of icons of the folders are displayed according to an embodiment of the present invention.

In another embodiment of the present invention, names of a plurality of folders are displayed in a plurality of icons of the folders. The differences between such an embodiment and previously described embodiments will now be described with reference to FIGS. 4-8. Three folder icons are included in a folder icon region $I_{B6F}$, and names of three folders set by a user are displayed in the folder icons, as shown in FIG. 8. For example, a folder name "family" is displayed in an activated folder icon. A folder name "landscape" is displayed in an icon indicating a previous folder of a folder of the activated folder icon. In addition, a folder name "friend" is displayed in an icon indicating a next folder of the folder of the activated folder icon.

In various embodiments of the present invention, the color LCD panel 35 includes a touch screen. When the user uses the touch screen, folder change signals, file change signals, and the movement signal are generated by the user input unit (INP of FIG. 2).

Another embodiment of the present invention will now be described with reference to FIGS. 3 and 9. In this embodiment, the digital image processing apparatus displays reduced representative images of a plurality of folders set by a user in a plurality of icons of the folders.

Figure 9:
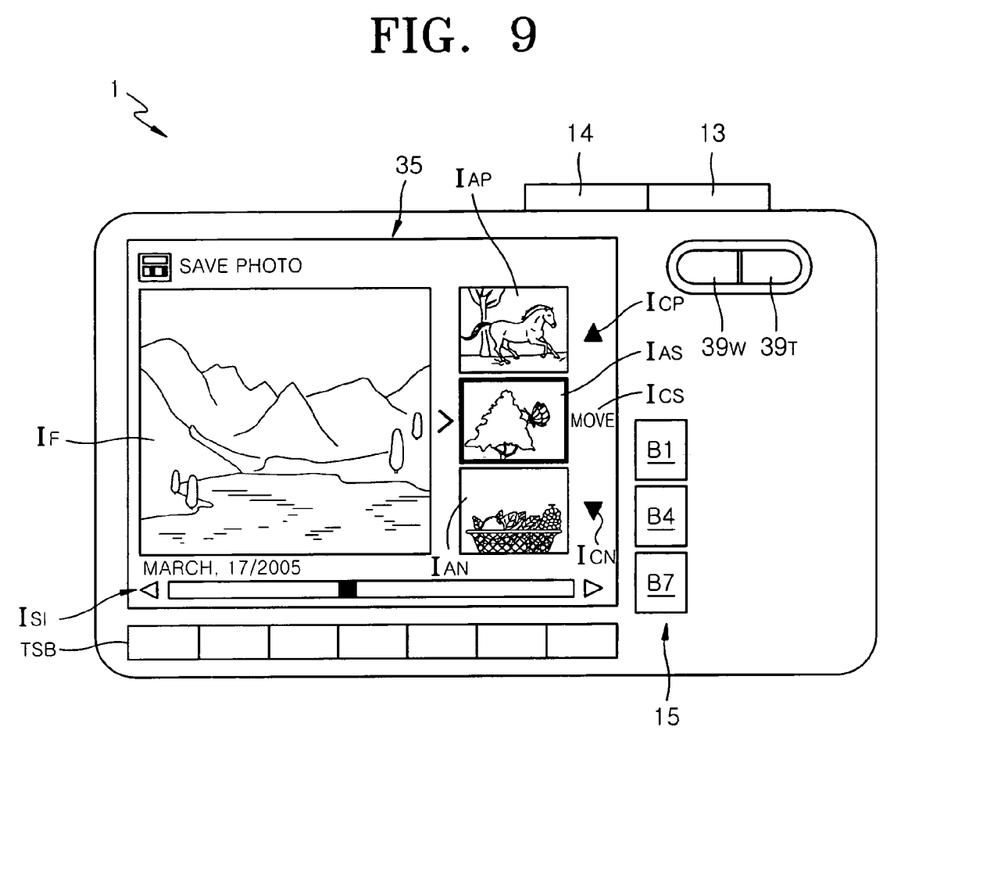
FIG. 9 illustrates the back of a digital camera on which reduced representative images of a plurality of folders set by a user in a plurality of icons of the folders are displayed according to an embodiment of the present invention.

In FIG. 9, reference character $I_F$ indicates an image icon of a file. Reference character $I_{AS}$ indicates an activated folder icon in which a representative image of an activated folder is displayed. Reference character $I_{AP}$ indicates a previous folder icon in which a representative image of a previous folder created before the activated folder is displayed. Reference character $I_{AN}$ indicates a next folder icon in which a representative image of a next folder created after the activated folder is displayed. Reference character $I_{CP}$ indicates a previous folder icon corresponding to a previous folder button, for example, B1. Reference character $I_{CS}$ indicates a movement icon corresponding to a movement button B5 which generates a movement signal. Reference character $I_{CN}$ indicates a next folder icon corresponding to a next folder button, for example, B7. Reference character TSB indicates a touch scroll button. Reference character $I_{SI}$ indicates a file position icon according to the operation of the touch scroll button TSB.

When the digital camera of FIG. 9 is in the movement mode and the DCP 507 (see FIG. 2) is being controlled according to the method illustrated in FIG. 3, icons $I_{AS}$, $I_{AP}$, $I_{AN}$ of representative images of a plurality of folders are displayed When a user presses the previous folder button or the next folder button, for example, B1 or B7, a folder change signal is generated. When the DCP 507 detects a folder change signal (operation S303), representative images displayed in the activated folder icon $I_{AS}$, the previous folder icon $I_{AP}$, and the next folder icon $I_{AN}$ are changed and thus a new folder is activated.

In the embodiment shown in FIG. 9, when the user presses the touch scroll button TSB, the file change signal of operation S306 and the select/cancel signal of operation S309 are generated. The movement signal of operation S313 is generated when the user presses the movement button, for example, B4.

Figure 10:
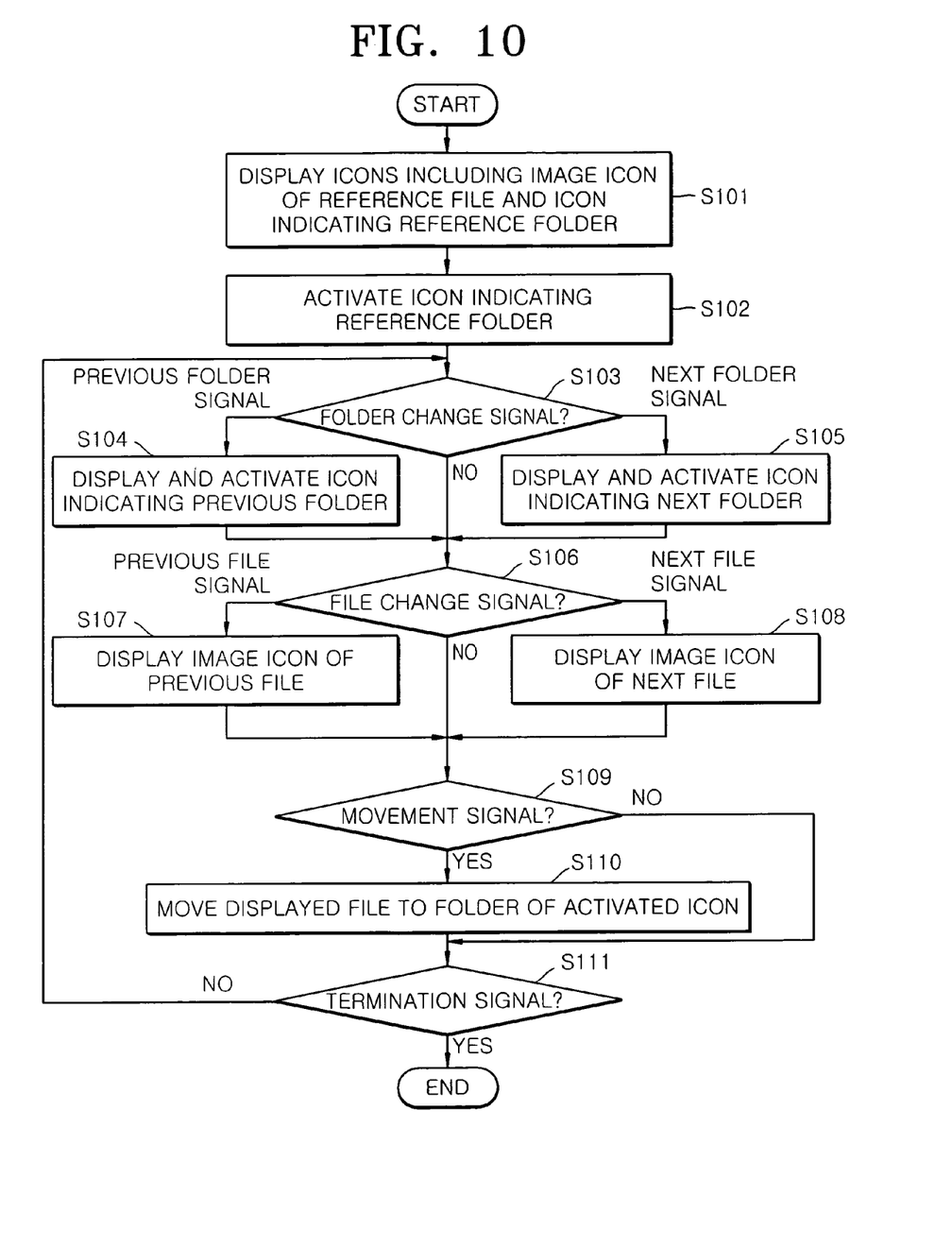
FIG. 10 is a flowchart illustrating an embodiment of a control program of the DCP illustrated in FIG. 2 wherein the digital camera 1 is in a movement mode.

FIG. 10 is a flowchart illustrating another embodiment of a control program of the DCP 507 illustrated in FIG. 2, wherein a digital camera 1 as a digital image processing apparatus is in the movement mode. The control program of the DCP 507 illustrated in FIG. 10 will now be described with reference to FIGS. 1, 2, 4, 5, 7, and 10.

The DCP 507 displays the nine icons $I_{B1}$ through $I_{B9}$ including the image icon $I_{B4}$ (see FIG. 1) of a reference file as a target reference object and the icon $I_{B6}$ (see FIG. 1) indicating a reference folder as a target reference position (operation S101). In this case, a file recently created is set as a reference file, and a folder recently created is set as a reference folder. Next, the DCP 507 activates the icon $I_{B6}$ of FIG. 1 indicating the reference folder (operation S102).

When a user presses a previous folder button B3, thereby generating a previous folder signal that is detected by the DCP 507 (operation S103), the DCP 507 displays and activates an icon indicating a previous folder of the reference folder indicated by the currently activated icon $I_{B6}$ (operation S104). When the user presses the next folder button B9, thereby generating a next folder signal that is detected by the DCP 507 (operation S103), the DCP 507 displays and activates an icon indicating a next folder of the reference folder indicated by the currently activated icon $I_{B6}$ (operation S105, see FIG. 5).

When the user presses the previous file button B1, thereby generating a previous file signal that is detected by the DCP 507 (operation S106), the DCP 507 displays an image icon of a previous file of the reference file indicated by the currently displayed icon $I_{B4}$ (operation S107, see FIG. 4). When the user presses the next file button B7, thereby generating a next file signal that is detected by the DCP 507 (operation S106), the DCP 507 displays an image icon of a next file of the reference file indicated by the currently displayed icon $I_{B4}$ (operation S108).

When the user presses the movement button B5, thereby generating a movement signal that is detected by the DCP 507 (operation S109), the DCP 507 moves the file currently displayed to the folder of the currently activated icon $I_{B6}$ (operation S110, see FIG. 7).

Operations S103 through S110 are repeated until an external termination signal is generated (operation S1).

As described above, according to a control method for a digital image processing apparatus and a digital image processing apparatus using the method, an image icon of a target object and an icon indicating a target position are displayed. In response to change signals generated by a user, a new target object and an icon indicating a new target position are displayed. In addition, a target object of an image icon currently displayed is moved to a target position of an icon currently displayed in response to a movement signal generated by the user. Since the user can easily move a target object to a desired target position in a movement mode, the user can easily sort files.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of controlling a digital camera having a user input unit with first, second, and third signal generators and a first memory and a second memory, the method comprising:

storing at least one image file including an image formed in the digital camera in the first memory;

storing at least one file folder in the second memory;

providing the first signal generator at a position corresponding to a target object image change icon;

providing the second signal generator at a position corresponding to a target position change icon;

providing the third signal generator at a position corresponding to a movement icon;

representing an image in a file stored in the first memory as the target object image icon, the target position icon corresponding to a folder formed on the second memory, the target object image change icon corresponding to a control signal to convert from the target object image icon and display a new target object image icon representing an image in another image file in previous or next to the image stored in the first memory, and the target position change icon corresponding to a control signal to convert from the target position icon and display a new target position icon indicating another file folder in previous or next to the folder on the second memory, displaying icons together in a window, wherein the icons comprises the target object image icon, the target position icon, the target object image change icon, the target position change icon, and the movement icon, detecting a target position change signal from the second signal generator;

in response to detecting the target position change signal, displaying the new target position icon changed from the target position icon;

detecting a target object change signal from the first signal generator;

in response to detecting the target object change signal, displaying the new target object image icon changed from the target object image icon;

detecting a movement signal from the third signal generator;

in response to detecting the movement signal, moving the target object represented by the target object image icon that is currently displayed to the target position represented by the target position icon that is currently displayed.

2. The method of claim 1, wherein the target object is on a first recording medium and the target position is on a second recording medium.

3. The method of claim 1, wherein the moving of the target object comprises copying the target object and moving the copy of the target object to the target position.

4. The method of claim 1, wherein the window is a single window having a single boundary defining it.

5. The method of claim 4, wherein the first, second, and third signal generators are located on a display outside of the single window.

6. A method of controlling a digital camera having a movement mode for moving a target object to a target position and having a user input unit with first, second, and third signal generators and a first memory, and a second memory, the method comprising:
   storing at least one image file including an image formed in the digital camera in the first memory;
   storing at least one file folder is stored in the second memory;
   providing the first signal generator at a position corresponding to a target object image change icon;
   providing the second signal generator at a position corresponding to a target position change icon;
   providing the third signal generator at a position corresponding to a movement icon;
   representing an image in a file stored in the first memory as the target object image icon, the target position icon corresponding to a folder formed on the second memory, the target object image change icon corresponding to a control signal to convert from the target object image icon and display a new target object image icon representing an image in another image file in previous or next to the image stored in the first memory, and the target position change icon corresponding to a control signal to convert from the target position icon and display a new target position icon indicating another file folder in previous or next to the folder on the second memory,
   the method comprising:
   displaying an image icon of a target object, an icon indicating a target position, a target image change icon, a target position change icon, and a movement icon together in a window;
   activating the icon indicating the target position;
   detecting a target position change signal from the second signal generator;
   in response to detecting the target position change signal, displaying and activating an icon indicating a new target position;
   detecting a target object change signal from the first signal generator;
   in response to detecting the target object change signal, displaying an image icon of a new target object;
   detecting a select/cancel signal;
   in response to detecting the select/cancel signal, (a) if the target object for the image icon currently displayed is not selected, selecting the target object for the image icon currently displayed, or (b) if the target object for the image icon currently displayed is selected, canceling the selected target object for the image icon currently displayed;
   detecting a movement signal from a third signal generator; and
   in response to detecting the movement signal, moving the selected target object to the target position indicated by the activated icon.

7. The method of claim 6, wherein the in the step of displaying and activating an icon indicating a new target position, the step of displaying comprises:
   if the target position change signal indicates a previous target position, displaying an icon indicating a previous target position of the target position indicated by the icon currently activated; and
   if the target position change signal indicates a next target position, displaying an icon indicating a next target position of the target position indicated by the icon currently activated.

8. The method of claim 6, wherein the target object change signal comprises a previous target object change signal and a next target object change signal, and in the step of displaying the image icon of the new target object, the step of displaying comprises:
   detecting the previous target object change signal, and in response thereto, displaying an image icon of a previous target object of the target object for the image icon currently displayed; and
   detecting the next target object change signal, and in response thereto, displaying an image icon of a next target object of the target object for the image icon currently displayed.

9. The method of claim 6, wherein:
   the step of selecting the target object for the image icon currently displayed comprises including a selection tag in an image of the image icon currently displayed and selecting the target object for the image icon currently displayed; and
   the step of canceling the selected target object for the image icon currently displayed comprises removing the selection tag from the image of the image icon currently displayed and canceling selection of the target object of the image icon currently displayed.

10. The method of claim 6, wherein the moving of the target object comprises copying the target object and moving the copy of the target object to the target position.

11. The method of claim 6, wherein the step of displaying an icon indicating a target position comprises displaying a plurality of icons corresponding to a plurality of target positions.

12. The method of claim 11, wherein the plurality of icons corresponding to a plurality of target positions comprises an icon indicating the previous target position of the target position of the activated icon and an icon indicating the next target position of the target position of the activated icon.

13. The method of claim 11, wherein, in the step of displaying an icon indicating a target position, a target position name set by a user is displayed in the icon indicating the target position.

14. The method of claim 11, wherein, in the step of displaying an icon indicating a target position, a reduced representative image of the target position is displayed in the icon indicating the target position.

15. A digital camera, wherein the digital camera comprises:
   a first memory that at least one file including an image formed in the digital camera is stored in;
   a second memory on which at least one folder is formed;
   a display panel for displaying digital images comprising icons together in a window, wherein the icons comprise a target object image icon representing an image formed in the digital camera and stored in the first memory, a target position icon corresponding to a file folder formed on the second memory, a target image change icon corresponding to a control signal to convert from the target object image icon and display a new target object image icon representing another image stored previous to or next to the image in the first memory, a target position change icon corresponding to a control signal to change from the target position icon and display a new target position icon indicating another folder formed previous to or next to the folder on the second memory, and a movement icon;

a user input unit for generating control signals, wherein the user input unit comprises a first signal generator at a position corresponding to the target image change icon, a second signal generator at a position corresponding to the target position change icon, and a third signal generator at a position corresponding to the movement icon; and a controller that detects the control signals and, in response thereto, controls the digital camera to:

display a new target position icon indicating another folder formed previous to or next to the folder on the second memory if a target position change signal is detected from the second signal generator;

display a new target object image icon representing another image stored previous to or next to the image in the first memory if a target object change signal is detected from the first signal generator; and move the target object corresponding to the target object image icon currently displayed to the target position corresponding to the target position icon currently displayed if a movement signal is detected from the third signal generator.

16. The digital camera of claim 15, wherein the user input unit comprises a plurality of input buttons and each icon is displayed in an area of the display panel that corresponds to one of the plurality of input buttons.

17. The digital camera of claim 15, wherein the display panel comprises a touch screen, and the touch screen includes the user input unit.

18. The digital camera of claim 15, wherein the user input unit comprises a touch scroll button and the target position change signal is generated by manipulation of the touch scroll button.

19. The apparatus of claim 15, wherein the first memory is a recording medium for storing files, and the recording medium is selected from the group consisting of: a built-in recording medium and an insertable recording medium.

20. The apparatus of claim 19, wherein the second memory is on the insertable recording medium, and the controller controls the digital camera to move the target object from the built-in recording medium to the target position on the insertable recording medium.

21. The digital camera of claim 19, wherein the target object is moved between a recording medium and a target apparatus for communication.

* * * * *